(12) United States Patent
Kim et al.

(10) Patent No.: US 6,839,473 B2
(45) Date of Patent: Jan. 4, 2005

(54) OPTICAL FIBER CLADDING WITH LOW POLARIZATION DEPENDENCE AND AN ACOUSTO-OPTIC TUNABLE FILTER WITH LOW POLARIZATION DEPENDENT LOSS ACHIEVED THROUGH THERMAL ANNEALING

(75) Inventors: Hyo-Sang Kim, Santa Clara, CA (US); David Vigdor Salamon, San Jose, CA (US); Seok-Hyun Yun, Santa Clara, CA (US)

(73) Assignee: Novera Optics, Inc., Palo Alto, CA (US)

(*) Notice: Subject to any disclaimer, the term of this patent is extended or adjusted under 35 U.S.C. 154(b) by 288 days.

(21) Appl. No.: 09/944,283

(22) Filed: Aug. 30, 2001

(65) Prior Publication Data

US 2002/0044711 A1 Apr. 18, 2002

Related U.S. Application Data (63) Continuation-in-part of application No. 09/738,282, filed on Dec. 14, 2000, now Pat. No. 6,532,323, which is a continuation of application No. 09/426,060, filed on Oct. 22, 1999, now Pat. No. 6,266,462, which is a continuation-in-part of application No. 09/022,413, filed on Feb. 12, 1998, now Pat. No. 6,021,237.

(30) Foreign Application Priority Data

Jun. 6, 1997 (KR) .............................. 97-24796

(51) Int. Cl.[7] ................................................ G02B 6/00
(52) U.S. Cl. .............................. 385/11; 385/28; 385/31; 385/38; 385/123; 385/43; 385/124; 385/27; 385/7; 385/29
(58) Field of Search ............................. 385/11, 15, 24, 385/25, 26, 27, 31, 123, 124, 141, 28, 7, 29, 43

(56) References Cited

U.S. PATENT DOCUMENTS

| | | | |
|---|---|---|---|
| 4,298,245 A | 11/1981 | Aulich et al. ............. 385/11 X |
| 4,915,468 A | 4/1990 | Kim et al. ................ 385/42 X |
| 5,506,925 A | 4/1996 | Greene et al. ........... 385/129 X |
| 5,704,960 A | * 1/1998 | Evans et al. ................. 65/402 |
| 5,822,487 A | * 10/1998 | Evans et al. ................ 385/123 |
| 5,953,121 A | 9/1999 | Bohnert et al. ............. 350/345 |
| 6,021,237 A | 2/2000 | Kim et al. .................... 385/28 |
| 6,169,830 B1 | * 1/2001 | Kewitsch et al. ............. 385/37 |
| 6,233,379 B1 | 5/2001 | Kim et al. .................... 385/28 |
| 6,266,462 B1 | 7/2001 | Kim et al. .................... 385/28 |
| 6,459,834 B1 | * 10/2002 | Kim et al. .................... 385/37 |
| 6,532,323 B2 | 3/2003 | Kim et al. .................... 385/28 |
| 6,597,839 B2 | * 7/2003 | Mihailov et al. ............. 385/37 |

FOREIGN PATENT DOCUMENTS

KR     10-0265865     6/2000

OTHER PUBLICATIONS

Kim et al., "Optical Fiber Cladding with low Polarization . . . ", U.S. patent application Publication No. U.S. 200/0044711A1, published Apr. 18, 2002.*

(List continued on next page.)

*Primary Examiner*—Brian M. Healy
(74) *Attorney, Agent, or Firm*—Blakely, Sokoloff, Taylor & Zafman LLP (57) ABSTRACT

This invention relates to a method of making optical fiber having low polarization dependence and an acousto-optical filter with low PDL. A section of the fiber is heated and then allowed to cool. At least the heating is controlled to reduce stresses in a cladding layer surrounding a core of the interaction length after the interaction length is allowed to cool to reduce polarization dependence of the cladding layer. Preferably, at least time and temperature of heating is controlled.

40 Claims, 7 Drawing Sheets

OTHER PUBLICATIONS

PCT/US 03/01245 International Search Report mailed on May 26, 2003.

"Production of Single–Mode Fibres with Negligible Intrinsic Birefringence and Polarisation Mode Dispersion", Electronics Letters, IEE Stevenage, GB, vol. 17, No. 20, Oct. 1, 1981 pp. 725–726, XP000676219 ISSN: 0013–5194.

Kyunghwan Oh et al., "Polarization dependent dispersion characteristics of high order modes in a cylindrical dual mode fiber with an arbitrary index profile", Optics Communication, vol. 159, Jan. 1, 1999 pp. 139–148, XP004152383.

Seok Hyun Yun et al. "Suppression of Polarization Dependence in a Two–Mode–Fiber Acousto–Optic Device", Optics Letters/vol. 21, No. 12/ Jun. 15, 1996, 1996 Optical Society of America, pp. 908–910.

Seok Hyun (Andy) Yun, "All–Fiber Acousto–Optic Devices and Their Applications to Fiber Lasers", Thesis, Department of Physics, Korea Advanced Institute of Science and Technology, Jun. 13, 1997, pp. whole document.

* cited by examiner

OPTICAL FIBER CLADDING WITH LOW POLARIZATION DEPENDENCE AND AN ACOUSTO-OPTIC TUNABLE FILTER WITH LOW POLARIZATION DEPENDENT LOSS ACHIEVED THROUGH THERMAL ANNEALING

CROSS-REFERENCES TO RELATED CASES

This application is a continuation-in-part of U.S. patent application Ser. No. 09/738,282, filed on Dec. 14, 2000, now U.S. Pat. No. 6,532,323 B2, which is a continuation of Ser. No. 09/426,060, filed Oct. 22, 1999, now U.S. Pat. No. 6,266,462, which is a continuation-in-part of Ser. No. 09/022,413, filed Feb. 12, 1998, now U.S. Pat. No. 6,021,237, which claims priority to Korean Application No. 97-24796, filed Jun. 16, 1997, now Republic of Korea Patent No. 10-0265865.

BACKGROUND OF THE INVENTION

1. Field of the Invention

This invention generally relates to a method of preparing optical fiber with low polarization dependence for use in acousto-optic applications, and, more particularly, to an acousto-optic filter employing such a fiber to reduce polarization-dependent loss (PDL) in the filter.

2. Discussion of Related Art

As an optical signal traverses an optical network, the signal is subject to losses and nonlinear effects that result in signal attenuation and distortion. Amplifiers, such as erbium-doped fiber amplifiers ("EDFA's"), are typically placed approximately every 80 kilometers along an optical fiber to boost signal strength. However, such amplifiers impose their own distortions on the signal power spectral distribution (as a function of wavelength). One of the major distortions is caused by the non-uniform gain profile (as a function of wavelength) of the amplifiers, which imposes a non-uniform spectral distribution on the amplified signals. It is especially important in wavelength division multiplexed ("WDM") networks to maintain a uniform spectral distribution across all channels.

Static filters are often used to attenuate the signal power as a function of wavelength to achieve a substantially uniform power distribution. Static filters, however, cannot adapt to dynamically changing conditions such as amplifier aging, temperature variations, channel add/drop, fiber loss and other changes in components along the transmission line. Moreover, the required filter shape is dependent upon system configuration e.g. the spacing between amplifiers. Static filter characteristics cannot be modified to compensate for these changes without replacing the filter itself.

To overcome these problems, it is known in the art to employ dynamic wavelength tunable filters to flatten or equalize the signal spectrum, as well as to obtain any desired spectral shape. One such filter is an all-fiber acousto-optic tunable filter ("AOTF") described in U.S. Pat. No. 6,233,379, entitled "Acousto-optic filter," which is assigned to the assignee of the present invention. As described in the patent, the all-fiber AOTF is a multiple notch filter, with a transfer function characterized by notch depth and center frequency (or wavelength).

One problem with the all-fiber AOTF is that the effect of the filter on light in the fiber is polarization dependent. For example, although the filter may attempt to place a notch at one desired center frequency, the notch will effectively be placed at a different center frequency for each polarization splitting one notch into two. The relative frequency shift between the polarization-dependent notches causes a difference between the transmissions of the different polarizations through the filter as a function of frequency, which results in a polarization-dependent loss in the filter. It is desired to reduce the polarization dependence of light in optical fiber, and to thereby reduce PDL in an all-fiber AOTF.

SUMMARY OF THE INVENTION

This invention relates to a method of making optical fiber having low polarization dependence and an acousto-optical filter, generally of the kind described in U.S. Pat. No. 6,266,462, with low PDL. A section of the fiber is heated and then allowed to cool. At least the heating is controlled to reduce stresses in a cladding layer surrounding a core of the interaction length after the interaction length is allowed to cool to reduce polarization dependence of the cladding layer. At least time and temperature of heating may be controlled.

The optical fiber may be used for constructing an acousto-optical filter. The filter includes a support, and first and seconds mounts at spaced locations on the support. The optical fiber has first and second mounted portions secured to the first and second mounts respectively. An exposed section of the fiber is heated and cooled between the first and second mounted portions. A signal generator is operable to generate a periodic signal. An electro-acoustic transducer has a terminal connected to the signal generator and an actuating portion, the electric signal causing vibration of the actuating portion, and the actuating portion being connected to the interaction length so that the vibration generates a transverse wave traveling along the interaction length. Such a filter has the ability to reduce an amplitude of one or more selected wavelengths of light as the light travels through the interaction length.

BRIEF DESCRIPTION OF THE DRAWINGS

The invention is further described by way of example with reference to the accompanying drawings wherein.

DETAILED DESCRIPTION OF THE INVENTION

Figures 1, 2:
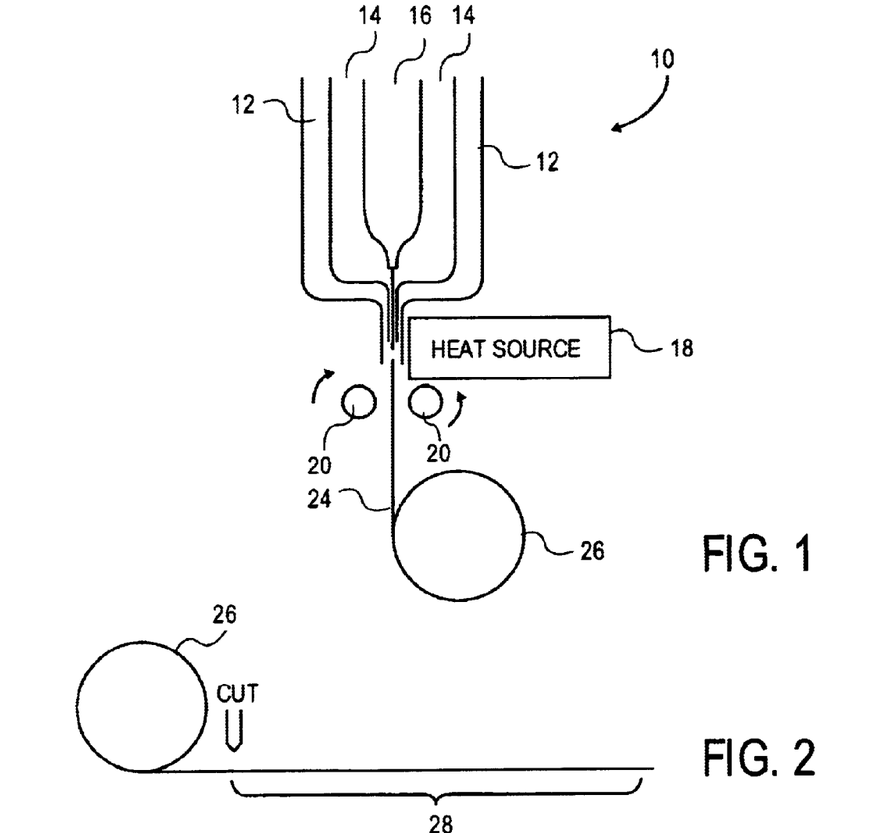
FIG. 1 is a side view illustrating manufacturing of optical fiber.
FIG. 2 is a side view illustrating severing of a length of optical fiber manufactured according to the process shown in FIG. 1.

Optical fiber fabrication typically consists of two major steps: preform fabrication and fiber drawing. There are a number of different methods for preform fabrication, such as modified chemical vapor deposition (MCVD), outside vapor deposition (OVD), and vapor-phase axial deposition (VAD). FIG. 1 shows a preform that is manufactured utilizing the MCVD technique. The process is initiated with a silica tube 12, which eventually forms an outer cladding layer of a fiber. An inner cladding material 14 is deposited on an inner surface of the silica tube 12, and eventually becomes an inner cladding layer of the fiber. A core material 16 is deposited on the inner cladding material 14.

A heat source 18 is located near an end of the preform 10. The heat source 18 heats the end of the preform 10 to approximately 2000° C. to melt it. Rollers 20 engage with material melted out of the end of the preform 10. The rollers 20 rotate, thereby drawing an optical fiber 24 out of the preform 10. As the fiber is drawn, a polymer jacket material (not shown) is coated on the fiber. The optical fiber 24 shown here is a single-mode fiber which is composed of the materials 12, 14, and 16, and is rolled into a roll 26.

Figure 3:
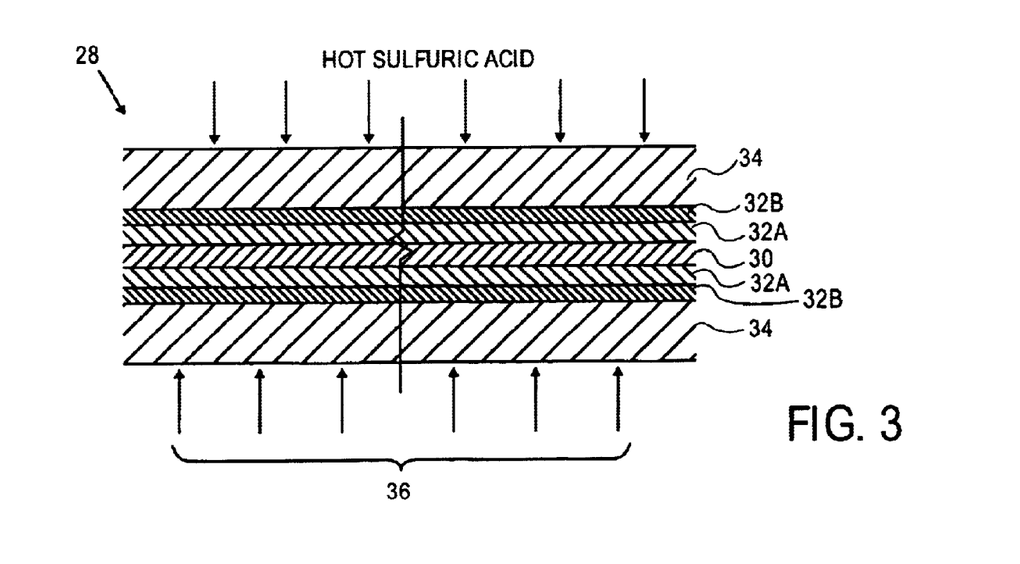
FIG. 3 is a cross-sectional side view of an interaction length of the severed length of the optical fiber of FIG. 2.

In FIG. 2, a length 28 of the fiber 24 is paid out from the roll 26 and cut from the remainder of the fiber on the roll 26 for the purpose of constructing an optical filter according to the invention. FIG. 3 illustrates in cross section a portion of the severed length 28. The optical fiber includes a glass core 30 made of the core material 16, a cladding layer 32 surrounding the core 30, wherein the cladding layer itself may include an inner cladding layer 32A surrounding the glass core 30, and an outer cladding layer 32B surrounding the inner cladding layer 32A. A jacket 34 surrounds the cladding material 32B.

Figure 4:
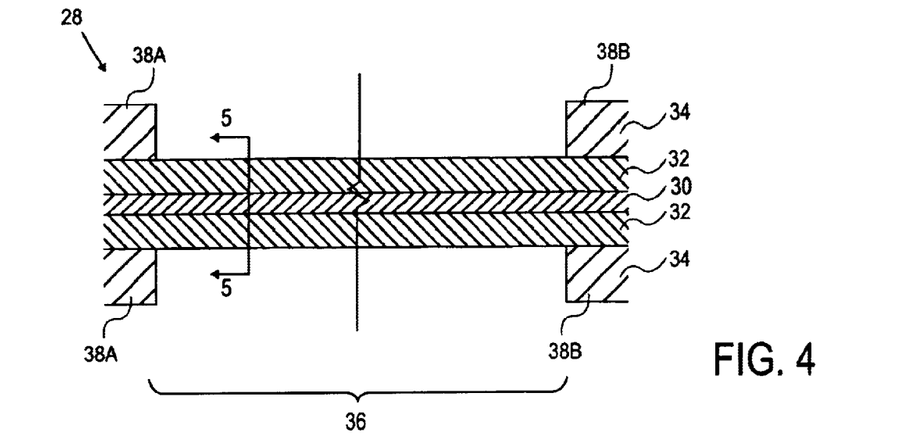
FIG. 4 is a view similar to FIG. 3 after a section of a jacket of the optical fiber is stripped.

As part of the process of constructing a filter according to the invention, a portion of the jacket 34 is removed to expose a section 36 of the fiber. A number of techniques may be employed to remove the jacket, including mechanical stripping and exposure to hot sulfuric acid, among others. FIG. 4 illustrates the severed length 28 after a portion of the jacket is stripped from the section 36. First and second portions 38A and 38B of the jacket remain on the cladding layer 32. The portions 38A and 38B are located on opposing sides of the stripped section 36.

In order to achieve guiding characteristics, the core 30 is designed to have a higher refractive index than the cladding region by adding impurities such as $GeO_2$ and $P_2O_5$ to the $SiO_2$ basis of the core material 16. Such impurities in the core 30 not only create the required refractive index difference with respect to the cladding 32A and 32B, but also make the coefficient of the thermal expansion (CTE) and the melting temperature different from that of the cladding. Therefore, when the preform is fabricated in a high temperature of approximately 2000° C. and cooled down to room temperature, a significant amount of stress is generated in the core 30 and the cladding 32A and 32B. This inherent stress is called "thermally-induced stress".

Moreover, when the preform 10 is pulled to the optical fiber 28 at the drawing tower, the optical fiber is exposed to a drawing tension of typically 100–1,000 N, and this stress becomes frozen in the optical fiber 28 while the optical fiber 28 is cooled down to room temperature. Therefore, an additional stress field is created in the optical fiber, which is called "mechanically-induced stress."

Figure 5A:
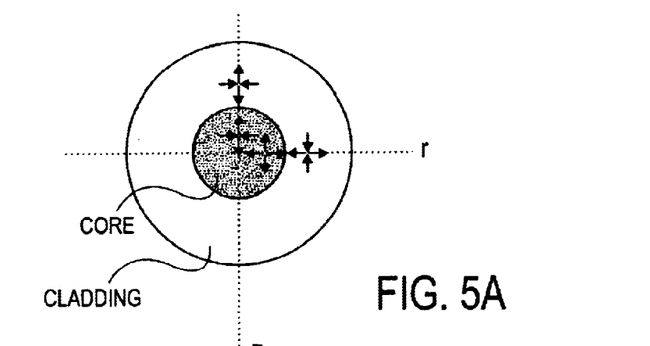
FIG. 5A is a cross-sectional end view on 5—5 in FIG. 4 illustrating stresses in a cladding layer of the interaction length.
Figure 5B:
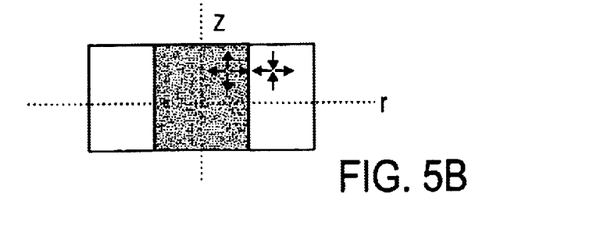
FIG. 5B is a cross-sectional plan view through a section of the optical fiber.

FIGS. 5A and 5B show the combined stress profile. The core is under axial, radial and tangential tensile stress. The cladding 32A and 32B is under radial tensile stress and under axial and tangential compressive stress. There is thus a discontinuity of the stress field in the core-cladding interface.

Figure 6:
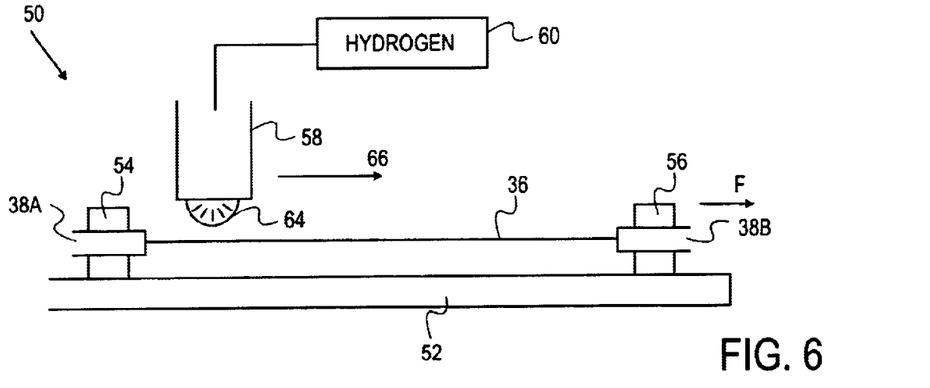
FIG. 6 is a side view illustrating apparatus that is used to anneal the cladding layer of the interaction length.

According to the invention, the cladding layer 32 of the stripped section 36 is then annealed utilizing an apparatus 50, as shown in FIG. 6. The apparatus 50 may employ, for example, a modified CW-200 Fused Coupler/WDM workstation sold by Lightel Technologies, Inc. of Kent, Wash. The apparatus 50 includes a support structure 52, first and second attachment formations 54 and 56 respectively, a flame nozzle 58, and a hydrogen source 60.

The attachment formation 54 is rigidly secured to the support structure 52. The attachment formation 56 is movably secured to the support structure 52. The hydrogen source 60 is connected to the flame nozzle 58. The flame nozzle 58 is secured to the support structure 52 for movement between the attachment formations 54 and 56.

In use, the portions 38A and 38B of the jacket 34 are attached to the first and second attachment formations 54 and 56, respectively. A force F is applied, which tends to move the attachment formation 56 away from the attachment formation 54, thereby creating a tension in the stripped section 36.

Hydrogen from the hydrogen source 60 flows to the flow nozzle 58 and is lit at an exit from the flame nozzle 58 to create a flame 64. The nozzle 58 and the flame 64 are located above the stripped section 36 so as to heat the stripped section 36 from above. Hydrogen may be preferred to any other source of fuel because hydrogen combustion does not produce carbon or hydrocarbon byproducts that may deposit on the cladding layer 32. Those skilled in the art will recognize that electro-resistive and other heating sources may be employed in the present invention instead of the hydrogen flame described in this example.

The nozzle 58 moves in a direction 66 parallel to the longitudinal axis of the stripped section 36. The advancing flame 64 heats areas of the stripped section 36 as those areas are exposed to the flame 64. Heating of the stripped section 36 is primarily due to radiation from the flame 64. Regions of the stripped section 36 trailing the flame 64 are allowed to cool. Cooling of the stripped section 36 is primarily due to convection of the heat to ambient air. The force F compensates for heat-induced elongation of the stripped section 36 by moving opposing ends of the stripped section 36 apart. The fiber is heated and cooled without the core 30 expanding by more than 20%.

The effect of heating and cooling the stripped section 36 is that the cladding 32A and 32B is annealed. Fiber formed by modified chemical vapor deposition has stress characteristics that are particularly conducive to the beneficial effects of this process.

The flame 64 may be in the range 1–20 mm wide as measured along the stripped section 36. The flame 64 may be held at a distance of 0.1–5 mm, or, or more particular 0.5–5 mm from the stripped section 36. Movement of the flame in the direction 66 may be at a speed of 1–50 mm per second, or, more particularly, 1–10 mm/s. The stripped section 36 may be heated to a temperature between 500–1300° C., and, more particularly, to between 800–1000° C. The force F may be in the range 0.05–0.5 N, or, more particularly, 0.05–0.15 N, maintained substantially constant.

Figure 7:
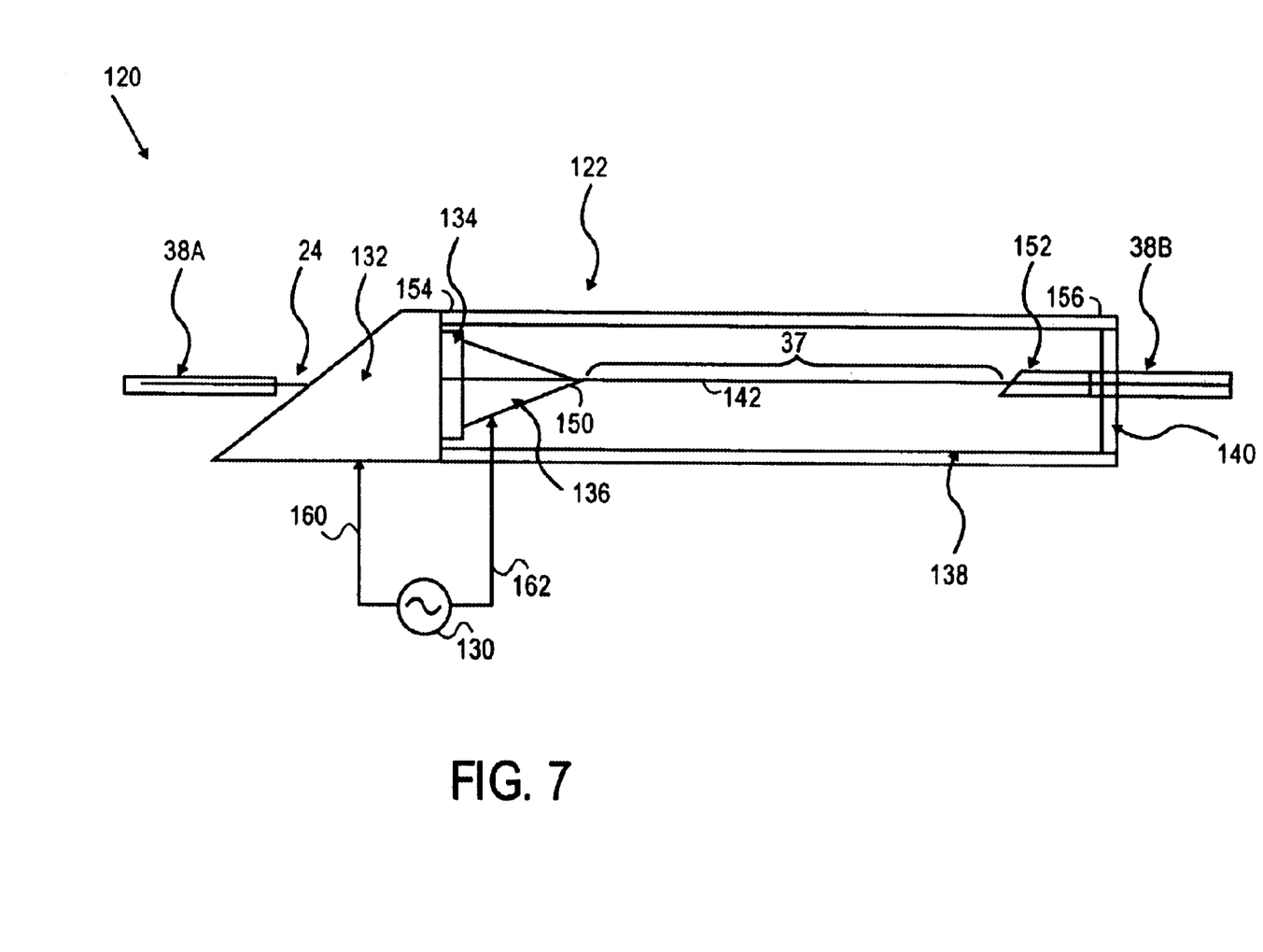
FIG. 7 is a cross-sectional side view of an acousto-optical tunable filter according to an embodiment of the invention.

FIG. 7 of the accompanying drawings illustrates an acousto-optic filter 120 constructed according to an embodiment of the invention. The filter 120 is of the kind described in U.S. Pat. No. 6,266,462, issued Jul. 24, 2001. The filter 120 includes a mounting construction 122, the severed length 28 of the optical fiber, and an electrical signal generator 130.

The mounting construction 122 includes a heat sink 132, an acoustic wave generator, such as a piezo-electric transducer 134, an acoustic wave propagation member 136, such as an aluminum horn, an outer tube arrangement 138, and an end plug 140.

Gold terminals are sputtered on opposing surfaces of the piezo-electric transducer 134. One terminal is located against the heat sink 132 and attached to the heat sink 132. The base of the acoustic wave propagation member 136 is then attached to an opposing terminal of the piezo-electric transducer 134.

Openings are made in the heat sink 132, piezo-electric transducer 134, and acoustic wave propagation member 136 to form a continuous passage. The end of the severed length 28 having the portion 38A of the jacket is inserted through the opening of the acoustic wave propagation member 136, whereafter it is inserted through the openings in the piezo-electric transducer 134 and the heat sink 132.

The portion 38B of the jacket is then located in a groove in the end plug 140. A resin is then placed in the groove and allowed to cure, thereby securing the portion 38B of the jacket to the end plug 140.

Resin is also applied to the interaction length 37 where it protrudes from a tip 150 of the acoustic wave propagation member 136, and flows into the tip 150 of the acoustic wave propagation member 136. The resin then cures and secures the interaction length 37 to the tip 150 of the acoustic wave propagation member 136.

A damper 152 is located on the optical fiber 142. The damper 152 is coaxially disposed on the stripped section 36 adjacent the portion 38B of the jacket. The length of exposed fiber from the tip 150 to the end of the damper 152 nearest the tip 150 is the "interaction length" 37 of the filter. Generally, the interaction length or "interaction region" is the length of fiber in which light is coupled from one mode to another, and, more particularly in this case, the portion of the exposed section 36 not covered by the damper 152.

An end 154 of the outer tube arrangement 138 is then located over the portion 38B of the jacket and moved over the end plug 140 until it contacts a surface of the heat sink 132. A second, opposing end 156 of the outer tube arrangement 138 is located over the end plug 140. The positioning of the end plug 140 is then adjusted within the end 156. By adjusting the positioning of the end plug 140, the interaction length 37 of the optical fiber 142 is tensioned by about 0.2 N to eliminate slack. When a predetermined tension in the interaction length 37 is reached, a resin is applied to an interface between the end plug 140 and the end 156. The resin is allowed to cure, thereby securing the end plug 140 stationarily within the end 156. The tension of the interaction length 37 is thereby set.

The signal generator is connected to the transducer 134 through leads 160 and 162. The lead 160 couples to the heatsink 132, which is itself electrically coupled to a terminal on one face of the transducer 134. The lead 162 is electrically connected to the opposing face of the transducer 134, either directly to the terminal on the opposing face, or indirectly through the acoustic wave propagation member 136. The heat sink 132 and the acoustic wave propagation member 136 can be made of conductive aluminum so that the terminals on the opposing sides of the piezo-electric transducer 134 are at the voltages of the leads 160 and 162, respectively. A voltage potential is thereby created across the piezo-electric transducer 134.

The signal generator 130 applies across the piezo-electric transducer 134 a voltage at one or more frequencies in the range 0–20 MHz, or more particularly 0–3 MHz. The voltage signal applied across the piezo-electric transducer 134 causes opposing surfaces of the piezo-electric transducer 134 to vibrate relative to one another in a direction transverse to a longitudinal axis of the interaction length 37. Adjusting the frequency and amplitude of the electrical signal applied to the transducer results in a corresponding change in the frequency and amplitude, respectively, of the mechanical vibration of the transducer. Those skilled in the art will recognize that the invention may employ acoustic wave exciters other than the acoustic wave exciter formed from the combination of the signal generator 130, acoustic wave generator 134 and acoustic wave propagation member 136 described herein.

Vibrations of opposing surfaces of the piezo-electric transducer 134 are transferred through the acoustic wave propagation member 136 to the tip 150 thereof. The tip 150 vibrates periodically in response to the change in the voltage. Movement of the tip 150 is transferred to the end of the interaction length 37 closest to the tip 150.

Figure 8:
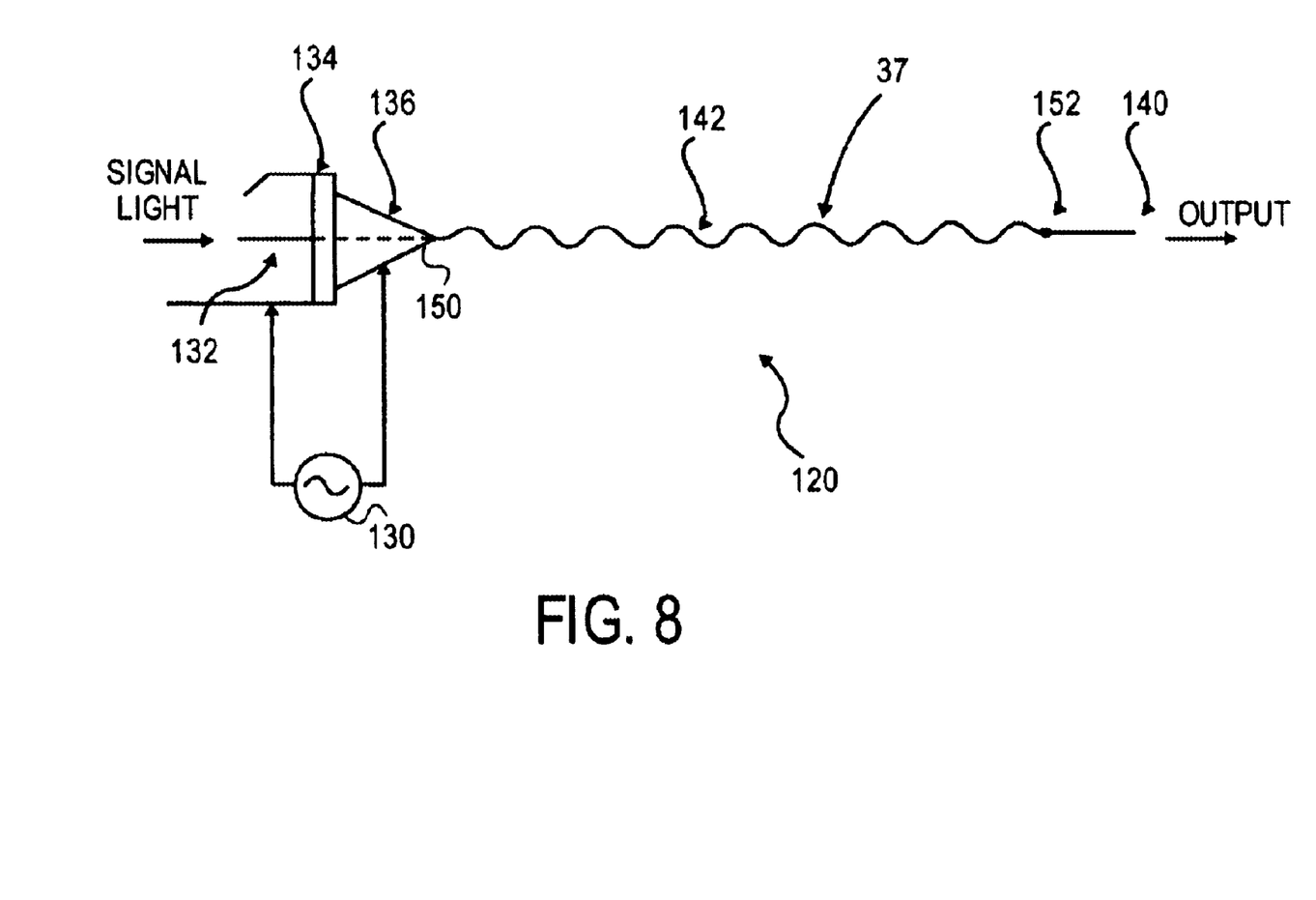
FIG. 8 is a side view illustrating functioning of the filter.

FIG. 8 illustrates how vibration of the tip 150 imposes acoustic waves in the interaction length 37. In the present example, the waves are y-direction transverse flexural waves that travel along the interaction length 37 from the tip 150 to the damper 152. The damper 152 is designed to absorb the waves or otherwise minimize reflection of the waves back to the tip 150. The creation of a standing wave is thereby prevented.

In use, the filter 120 is inserted into a fiber optic transmission line. A light signal is transmitted through the core 30. The light signal may be modulated as a WDM signal having many channels, each at a different wavelength. For various reasons, including the non-uniform gain profiles of amplifiers along the fiber optic transmission line, the intensity of light may differ from channel to channel at the point where the light enters the optical fiber 142 of the filter 120.

The effect of the acoustic waves in the interaction length 37 is that the intensity of selected wavelengths of light traveling through the interaction length 37 is attenuated by coupling these wavelengths from a mode in the core into one or more modes in the cladding layer 32 of the interaction length 37. This coupling creates a notch in the transmission spectrum centered at each selected wavelength. By changing the frequency of the applied electrical signal, and thus the frequency of the acoustic waves in the interaction length 37, the center wavelength of the notch can be altered. Furthermore, by changing the magnitude of the applied voltage (and thereby the magnitude of the acoustic wave), the depth of the notch (representing the amount of light coupled to the other mode) can be changed. By cascading multiple acoustic exciter/interaction length combinations and/or applying multiple acoustic frequencies with each exciter, a combination of notches of different optical center frequencies and depths may be achieved, thereby allowing creation of a desired filter transfer-function as described in Ser. No. 09/738,282, now U.S. Pat. No. 6,532,323 B2. Such a filter may be employed for gain equalization purposes. Those skilled in the art will recognize that, as an alternative to coupling light between core and cladding modes, an AOTF may also couple light between different core modes. Further details of the functioning of the filter 120 are described in U.S. Pat. No. 6,266,462 referenced above.

Figure 9:
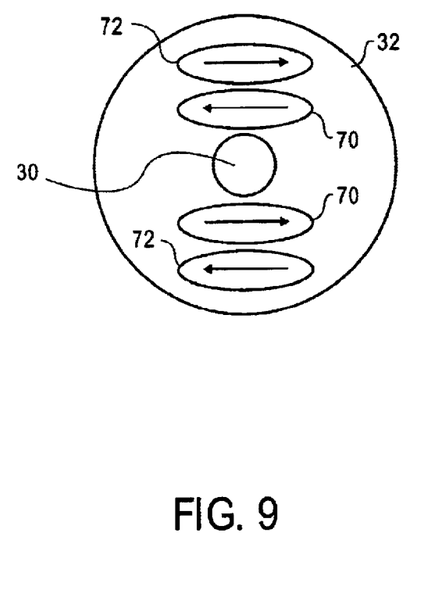
FIG. 9 is a view similar to FIG. 7 illustrating coupling of x-polarized light into the cladding layer.
Figure 10:
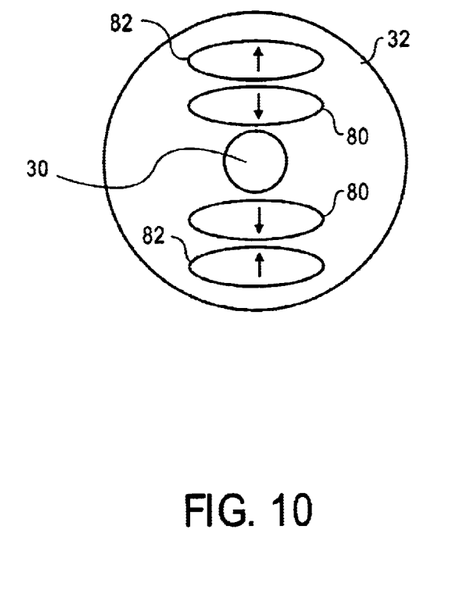
FIG. 10 is a view similar to FIG. 9 illustrating coupling of y-polarized light into the cladding layer.

FIGS. 9 and 10 illustrate how light is coupled into the cladding layer 32 after application of an acoustic wave. These figures are for conceptual purposes only, and do not necessarily reflect the actual intensity distribution in the fiber. Light traveling in the core mode in the core 30 couples into both an x-polarized cladding mode including regions 70 and 72 in the cladding 32 (as shown in FIG. 9), and into a y-polarized cladding mode including regions 80 and 82 (as shown in FIG. 10). X-polarized and y-polarized components of light traveling in the core couple preferentially into corresponding x-polarized and y-polarized cladding modes, as shown in FIGS. 9 and 10, respectively. The arrows in FIGS. 9 and 10 indicate the direction and phase differences of the polarization of the light in each mode.

The center wavelength $\lambda_0$ of light coupling into the cladding layer 32 is a function of the index of refraction $\beta$ of the material of the cladding layer 32. At different points in the fiber, stress in the cladding layer changes the index of refraction $\beta$ to an effective index of refraction $\beta_{\mathit{eff}}$ which is different from the index of refraction $\beta$ without any stress in the cladding layer 32. As a result of this stress-induced change in refractive index, the center wavelength $\lambda_0$ shifts, and is thus also recognized as a function of stress in the cladding layer 32.

Referring to FIGS. 5A and 5B, there is a larger tensile stress in the x-direction than in the y-direction. The larger tensile stress in the x-direction results in an effective index of refraction in the x-direction $\beta_{\mathit{eff}\text{-}x}$ which differs from the index of refraction $\beta$ of the cladding layer 32 with no stress therein. The effective index of refraction in the y-direction $\beta_{\mathit{eff}\text{-}y}$ is however substantially equal to the index of refraction $\beta$ of the cladding layer 32 without stresses in the cladding layer 32. The effective index of refraction in the x-direction $\beta_{\mathit{eff}\text{-}x}$ is thus different from the effective index of refraction in the y-direction $\beta_{\mathit{eff}\text{-}y}$ due to the tangential stresses 40. Light coupling from the core 30 to x and y polarized modes, as shown in FIGS. 9 and 10, will thus be coupled at different center wavelengths, $\lambda_{0\text{-}x}$ and $\lambda_{0\text{-}y}$.

Figure 11:
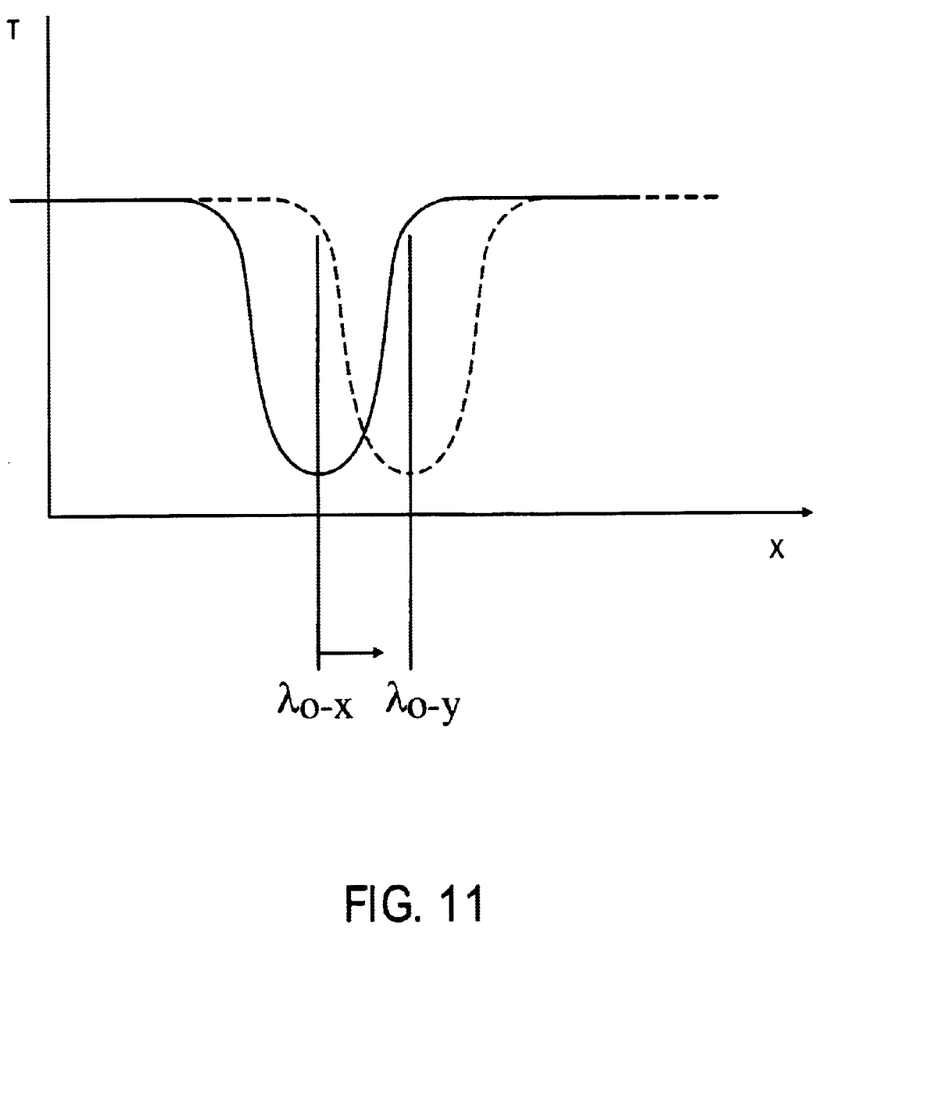
FIG. 11 is a graph illustrating transmission of x-polarized light and y-polarized light through a core of the fiber, both before and after annealing.

FIG. 11 illustrates how the filter of FIG. 7 filters light when the stresses are not reduced as in FIG. 5. Wavelengths $\lambda$ are shown on the abscissa and transmission T through the core 30 is shown on the ordinate. It can be seen that there is a relatively large difference between the center notch wavelength of x-polarized light $\lambda_{0\text{-}x}$ and the center notch wavelength of y-polarized light $\lambda_{0\text{-}y}$.

Annealing the cladding layer 32, as discussed with reference to FIGS. 5A and 5B, causes a reduction in tensile stress in the x-direction. A reduction in tensile stress in the x-direction causes a reduction in the stress difference between the x- and y-directions and a corresponding reduction in the difference between the effective index of refraction in the x-direction $\beta_{\mathit{eff}\text{-}x}$ and effective index of refraction in the y-direction $\beta_{\mathit{eff}\text{-}y}$. There is also a corresponding reduction in the difference between the center wavelengths of x-polarized light $\lambda_{0\text{-}x}$ and y-polarized light $\lambda_{0\text{-}y}$, respectively. Referring again to FIG. 11, annealing causes the center notch wavelength of the x-polarized light $\lambda_{0\text{-}x}$ to move towards the center notch wavelength of y-polarized light $\lambda_{0\text{-}y}$ as indicated by the arrow. This reduction in the difference between the center notch wavelengths indicates a reduction in the polarization dependence of light coupling into the cladding layer, along with a corresponding reduction in the PDL of the filter.

Figure 12:
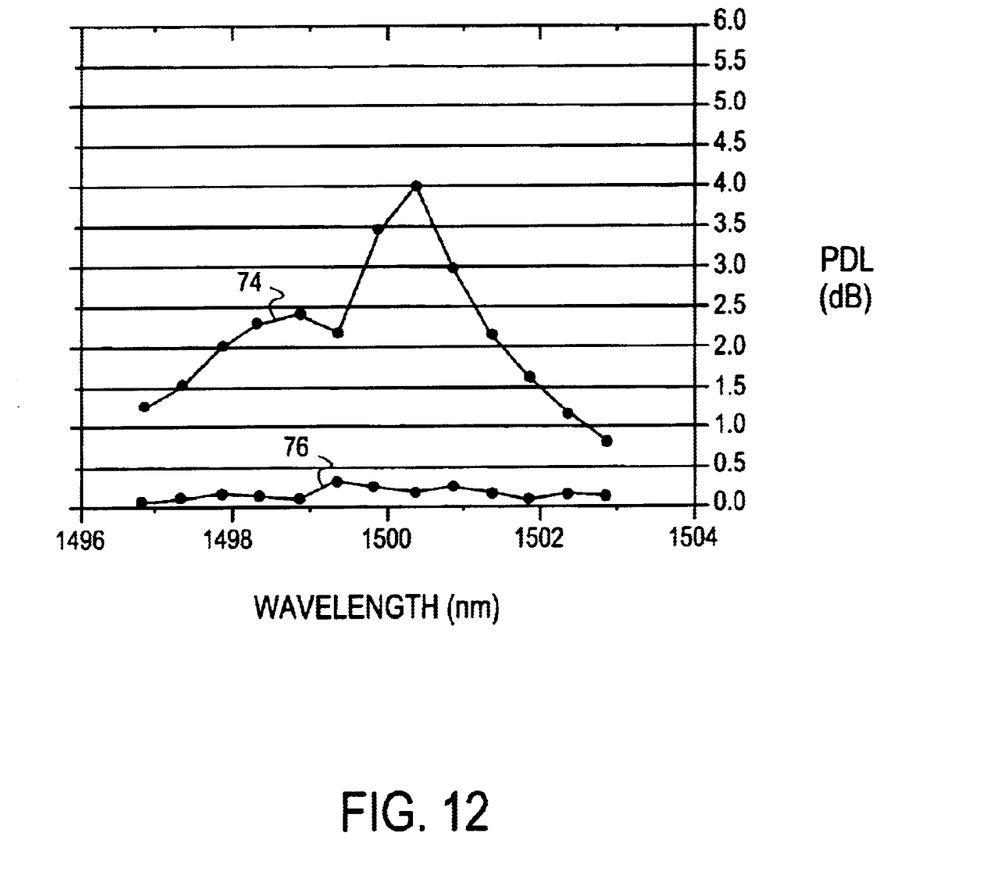
FIG. 12 is a graph illustrating PDL before and after annealing.

FIG. 12 illustrates the extent to which PDL is reduced. The PDL of the filter is defined by the following formula:

$$PDL=|T_x-T_y|,$$

where $T_x$ is transmission of x-polarized light and $T_y$ is transmission of y-polarized light through the core 30. The PDL before annealing is represented by line 74 and the PDL after annealing is represented by line 76. The PDL before annealing is as much as 4 decibels (dB) before annealing, and less than 1.0 dB, or, more particularly, less than 0.5 dB, after annealing.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed is:

1. A method of reducing polarization dependence in a cladding layer of an optical fiber, wherein the cladding layer surrounds a core of the optical fiber, the method comprising:
   heating a section of the optical fiber; and
   allowing the section to cool, the heating being controlled to reduce polarization dependence in the cladding layer, wherein the section is heated and allowed to cool such that the core of the fiber does not expand by more than 20%.

2. The method of claim 1 wherein the reduction in polarization dependence is due to a reduction of stresses in the cladding layer.

3. The method of claim 1 wherein time and temperature of heating are controlled to reduce polarization dependence in the cladding layer.

4. The method of claim 1 wherein the optical fiber is a single mode optical fiber.

5. The method of claim 1 wherein the polarization dependence is reduced after the optical fiber is cooled.

6. The method of claim 1, wherein the section is heated to a temperature between 500° C and 1500° C.

7. A method of reducing polarization dependence in a cladding layer of an optical fiber, wherein the cladding layer surrounds a core of the optical fiber, the method comprising:
   heating a section of the optical fiber with a flame, wherein the flame is between 1 and 20 mm wide as measured in a direction parallel to the longitudinal axis of the section; and
   allowing the section to cool, the heating being controlled to reduce polarization dependence in the cladding layer.

8. The method of claim 7, wherein the flame is a hydrogen flame.

9. The method of claim 6, wherein the flame is held at a distance of between 0.5 mm and 5 mm from the section.

10. The method of claim 7 wherein the flame is moved relative to the section in a direction parallel to the longitudinal axis of the section.

11. The method of claim 10 wherein the flame moves relative to the section at a speed of between 1 and 50 mm/s.

12. The method of claim 1, further comprising:
    moving opposing ends of the section apart to compensate for an increase in length of the section while being heated.

13. The method of claim 12, wherein the opposing ends are moved apart with a force of between 0.05 N and 0.5 N.

14. The method of claim 1, further comprising:
    moving a flame which heats the section and has a width of between 1 mm and 20 mm as measured in a direction parallel to the longitudinal axis of the section at a speed of between 1 and 50 mm/s in a direction parallel to the longitudinal axis of the section while maintaining the flame at a distance of between 0.5 and 5 mm from the section.

15. The method of claim 14 further comprising:
applying a force of between 0.05 N and 0.5 N which moves opposing ends of the section apart, while the section is being heated, to compensate for a decrease in tension of the section while being heated.

16. The method of claim 1 further comprising:
stripping a jacket surrounding the cladding layer of the section to expose the section prior to heating the section.

17. The method of claim 16 wherein two portions of the jacket on opposing sides of the exposed section remain around the cladding layer after stripping the jacket surrounding the cladding layer of the section.

18. The method of claim 16, wherein the jacket is stripped by exposure to sulfuric acid.

19. The method of claim 1, wherein the optical fiber is formed by modified chemical vapor deposition.

20. A method of constructing an optical filter, comprising:
heating an exposed section of an optical fiber;
allowing the section to cool; and
acoustically coupling an acoustic wave to the optical fiber to generate a flexural wave traveling along the exposed section, wherein the heating of the exposed section is controlled to reduce polarization dependent loss of the filter.

21. The method of claim 20, further comprising:
stripping a jacket surrounding a cladding layer of the section to expose the section prior to heating the section.

22. The method of claim 21 wherein two portions of the jacket on opposing sides of the exposed section remain around the cladding layer after stripping the jacket surrounding the cladding layer of the section.

23. The method of claim 20 wherein time and temperature of heating are controlled to reduce polarization dependence in a cladding layer of the section.

24. The method of claim 20, further comprising:
mounting two portions of the optical fiber located at opposing ends of the exposed section to first and second mounts respectively, the mounts being secured to a support frame, so that the section is under tension.

25. The method of claim 24 wherein the polarization dependent loss is reduced to less than 1.0 dB.

26. The method of claim 23 wherein the polarization dependence in the cladding is reduced to an extent so that polarization dependent loss of the filter is less than 1.0 dB.

27. The method of claim 20 further comprising:
moving opposing ends of the exposed section apart to compensate for an increase in length of the exposed section while being heated.

28. An acousto-optic filter comprising:
an acoustic wave exciter; and
an optical fiber having an interaction region, the acoustic wave exciter applying an acoustic wave to the interaction region to couple light from a first mode to a second mode, wherein the amount of polarization dependence in the interaction region results in a polarization dependent loss of the filter that is less than 1.0 dB.

29. The filter of claim 28 wherein the interaction region is a portion of the optical fiber that has been annealed.

30. The filter of claim 29 wherein the interaction region includes a cladding layer in which polarization dependence has been reduced by the annealing, and the reduced polarization dependence of the cladding layer results in the polarization dependent loss less than 1.0 dB.

31. The filter of claim 28 wherein the interaction region includes a cladding layer in which polarization dependence has been reduced, and the reduced polarization dependence of the cladding layer results in the polarization dependent loss less than 1.0 dB.

32. The filter of claim 28 wherein the first mode is a core mode and the second mode is a cladding mode.

33. The filter of claim 31 wherein the first mode is a core mode and the second mode is a cladding mode.

34. The filter of claim 28 wherein the interaction region is a portion of the optical fiber in which a jacket has been removed.

35. The filter of claim 28 wherein the frequency of the light coupled between modes relates to the frequency of the acoustic wave applied to the interaction region.

36. The filter of claim 35 wherein the amount of light coupled between modes relates to the magnitude of the acoustic wave applied to the interaction region.

37. The filter of claim 30 wherein the annealing comprises controlled heating followed by cooling of existing fiber to reduce stresses in the cladding layer of the interaction region, thereby reducing polarization dependence in the cladding region.

38. The filter of claim 28, the acoustic wave exciter comprising an acoustic wave generator and an acoustic wave propagation member, wherein the acoustic wave propagation member applies to the interaction region an acoustic wave generated by the acoustic wave generator.

39. An acousto-optical filter comprising:
a support;
first and second mounts at spaced locations on the support;
an optical fiber having first and second mounted portions secured to the first and second mounts respectively and an interaction length between the first and second mounted portions, at least the interaction length having a core and a cladding layer on the core;
a signal generator operable to generate a periodic signal; and
an electro-acoustic transducer having a terminal connected to the signal generator and an actuating portion, the periodic electric signal causing periodic vibration of the actuating portion, and the actuating portion being connected to the interaction length so that the vibration generates flexural wave traveling along the interaction length so that a frequency of light propagating through the core couples into the cladding layer, stresses in the cladding layer being sufficiently low so that the light coupling into the cladding layer has polarization dependent loss of less than 1.0 dB.

40. The filter of claim 39 wherein polarization dependence in the optical fiber is reduced by:
heating a section of the optical fiber; and
allowing the section to cool, the heating being controlled to reduce stresses in the cladding layer of the section, thereby reducing polarization dependence in the cladding layer.

* * * * *